United States Patent [19]

Povlick

[11] Patent Number: 4,462,102
[45] Date of Patent: Jul. 24, 1984

[54] METHOD AND APPARATUS FOR CHECKING THE PARITY OF DISASSOCIATED BIT GROUPS

[75] Inventor: Timothy R. Povlick, Pittsburgh, Pa.

[73] Assignee: International Business Machines Corporation, Armonk, N.Y.

[21] Appl. No.: 321,035

[22] Filed: Nov. 13, 1981

[51] Int. Cl.³ .............................................. G06F 11/10
[52] U.S. Cl. ...................................... 371/49; 364/738
[58] Field of Search .................. 371/49; 364/738, 200, 364/900

[56] References Cited

U.S. PATENT DOCUMENTS

| 4,155,070 | 5/1979 | Munter .................................. 371/49 |
| 4,224,681 | 9/1980 | Lewine ................................. 364/738 |
| 4,251,884 | 2/1981 | Baun, Jr. .............................. 371/49 |

OTHER PUBLICATIONS

Low, "Shared Parity Checker", *IBM Tech. Disclosure Bulletin*, vol. 11, No. 7, Dec. 1968, pp. 882–883.
Macak et al., "Parity Check Circuit for Unequal Byte Size Transfers", *IBM Tech. Disclosure Bulletin*, vol. 11, No. 10, Mar. 1969, p. 1248.
Grimes, "Address Error Checker for Remote & Local Scattered Bits", *IBM Tech. Disclosure Bulletin*, vol. 22, No. 2, Jul. 1979, pp. 456–457.

*Primary Examiner*—David H. Malzahn
*Attorney, Agent, or Firm*—Saul A. Seinberg

[57] ABSTRACT

A method and apparatus for determining the parity of data bits that have been disassociated from their parity bits and regrouped by a data byte shifter/converter or like apparatus. The lack of usually available parity bit association is overcome by generating a parity bit for each of the groups, including the parity bits, formed by the disassociative procedure. The group parity bits are then logically checked by an appropriate number of exclusive OR gates to determine their overall parity. A resultant parity signal is thereby generated which accurately reflects the parity state of the original data, unless an even number of bit errors have occurred. An odd number of bit errors is detected and, if appropriate, then alarmed.

7 Claims, 3 Drawing Figures

METHOD AND APPARATUS FOR CHECKING THE PARITY OF DISASSOCIATED BIT GROUPS

BACKGROUND OF THE INVENTION

1. Field of the Invention

This invention is concerned with a method and arrangement for parity checking in a data processing system. More particularly, this invention relates to a method and arrangement for checking parity where data has been rearranged or formatted so that its constituent bytes thereby each become separated from the parity bits with which they are normally associated.

2. Description of the Prior Art

Peripheral input/output devices supply data to digital data processors in the form of binary coded characters, wherein each character represents a single alphabetical letter, numerical digit, graphic symbol, any punctuation mark for example, or control character. In a typical class of present day, large-scale data processors, each character has a length of one byte, with a byte being defined as a sequence of eight adjacent binary data bits. Eight bits provide 256 different unique code values and, hence, a character set that can represent up to 256 different characters.

In the case of numerical data, the data from the input/output device is in a zoned decimal format wherein the lower order four bits of each character or byte constitute a zone field. The four-bit digit field contains a binary coded decimal representation of a decimal digit value and the four-bit zone field contains a unique zone code which identifies the character as being a numerical value and not an alphabetic, graphic symbol or control character.

Unfortunately, the arithmetic and logic units which perform the numerical calculations in most present-day data processors cannot handle numeric data in the zoned format. The presence of the zone fields would produce erroneous results. Thus, it is necessary to convert the zoned numerical data received from an input/output device to a packed decimal format before using it to perform numerical calculations. This is accomplished by deleting the zone fields and placing the digit fields adjacent to each other so as to form continuous sequences having only digit fields. The performance of this zone-to-packed format conversion is commonly referred to as "packing".

A converse type of situation obtains when it is desired to send the results of numerical calculations back to a peripheral input/output device. The numerical results must be converted from the packed format back to the zoned format before the data is returned to the input/output device. This requires the separation of the digit fields and the insertion of the unique zone field code for numerical characters in the intervening spaces. The performance of this packed-to-zoned format conversion is commonly referred to as "unpacking".

Data format converting apparatus for use in data processing systems to achieve the above-stated results are described in commonly assigned U.S. Pat. No. 3,168,723 which issued to Foin et al on Feb. 2, 1965 and in commonly assigned U.S. Pat. No. 4,141,005 which issued to Bonner et al on Feb. 20, 1979. While the byte shifter or format conversion aspects of such apparatus works rather well, the user is left without any means of checking parity on the data bus entering the format converting apparatus. In the Bonner et al implementation, for example, the eight parity bits associated with each of the data bytes are stripped therefrom. The parity bits are then passed through to a destination register. At the destination register, each byte is reassembled together with its associated parity bit, at which point a parity check can be made.

Unfortunately, the discovery of a parity error at this point will not lead to easy isolation of the cause thereof. The parity error, may simply mean that a particular data byte and its associated parity bit were in error before entering the byte shifter. It could also mean that a malfunction has occurred in the shifter circuitry and caused the parity error. In most instances, isolation of the fault is impractical or impossible.

OBJECTS AND SUMMARY OF THE INVENTION

Accordingly, it is a principal object of the present invention to provide circuitry that will check parity of the entire data bus input to a byte shifter or data format converter.

It is another object of the present invention to provide a parity checker for the input data bus of a byte shifter which requires only one error checking circuit.

It is a further object of the present invention to provide a parity checking arrangement and method which is readily compatible with and susceptible of economic implementation in large scale or very large scale integrated circuitry.

These and other objects of the present invention are realized by providing first circuit means for generating a parity bit, in accordance with a predetermined parity convention, for each of the groups of segregatable data bits that result from operation of a data shifter/converter. The generated parity bits also include one for the group of original parity bits, which are now all disassociated from the respective data bytes that were input to the shifter/converter. The generated parity bits are logically tested by second circuit means to determine and generate a resultant overall parity signal for the disassociated data. The resultant parity signal, after verification for correctness, is then employed to alarm the data processing system if a parity error is found. The foregoing arrangement is effective whenever the number of bit errors is odd.

BRIEF DESCRIPTION OF THE DRAWINGS

Referring now to the drawings where like reference numerals have been used in the several views thereof to identify like elements.

DESCRIPTION OF THE PREFERRED EMBODIMENT

Figure 1:
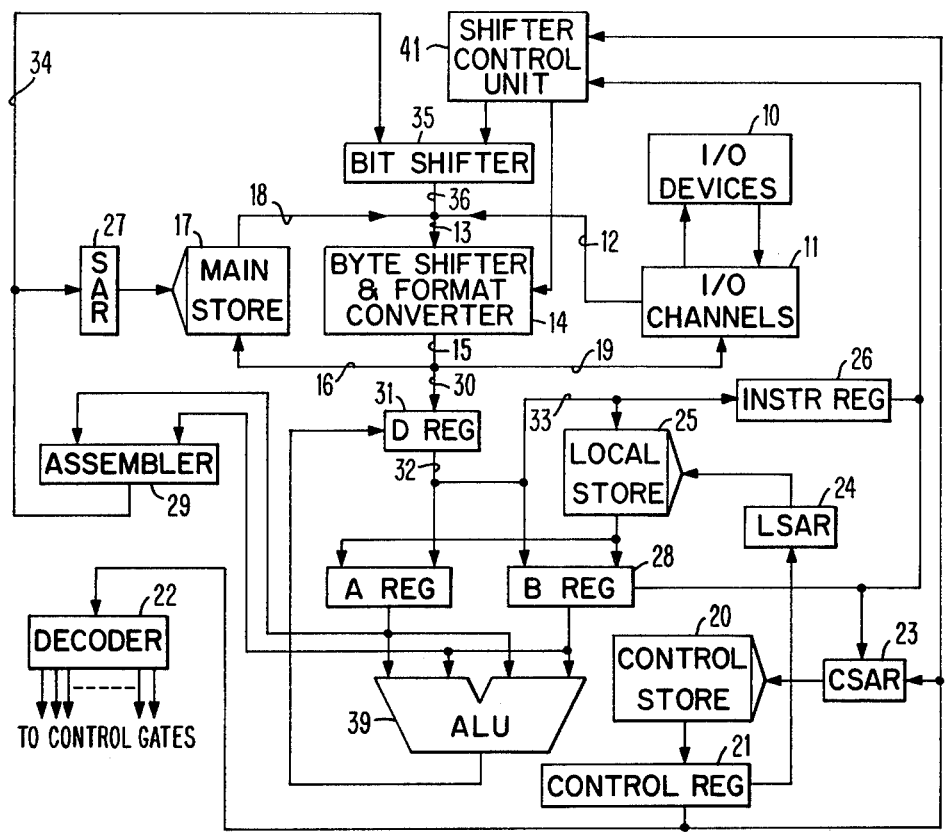
FIG. 1 shows a functional block diagram of a typical microprogram controlled data processing system wherein a data shifter/converter is employed to alter the format of data as appropriate to its operating needs.
Figure 2:
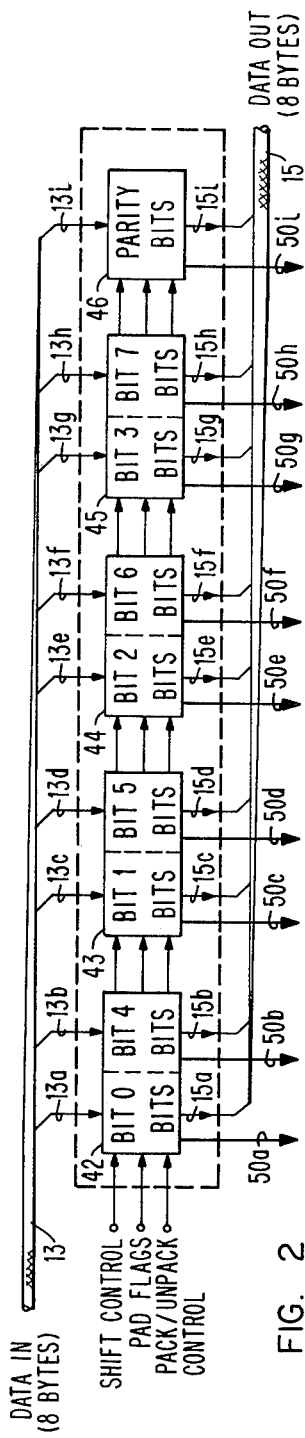
FIG. 2 illustrates a functional block diagram of data shifting and format converting apparatus used in the FIG. 1 system.

FIG. 1 shows a functional block diagram of the data flow of a typical microprogram controlled digital data processor in which the present invention is particularly suitable for use. FIG. 2 shows additional details of the byte shifter and data format converter 14 employed in the FIG. 1 processor. In detail and operation, the data format converting apparatus 14 depicted in FIGS. 1 and 2 is identical to that shown and described in the aforementioned, commonly assigned U.S. Pat. No. 4,141,005 to Bonner et al. Further and more specific details of its constituent elements and operation can be obtained by referring to the patent.

As noted, FIG. 1 shows the data flow for a representative large-scale microprogram controlled digital data processor wherein the present invention may be used with considerable advantage. Unless otherwise noted, the data buses and functional units shown in FIG. 1 are provided with a data handling width of several bytes so that multibyte chunks of data can be moved and manipulated in a parallel and simultaneous manner. For the sake of example, it is assumed that the basic data flow width is eight bytes and that each byte is composed of eight data bits plus one parity check bit. Thus, for this example, the data will for the most part, be moved and manipulated in seventy-two bit chunks, including the parity bits.

A user application program in machine language form is supplied to the data processor by a peripheral input/output (I/O) device 10 which may be, for example, a punched card reader or magnetic tape unit. The instructions and data making up the program are supplied by way of an I/O channel 11, data buses 12 and 13, a byte shifter and data format converter 14 and data buses 15 and 16 to a main storage unit 17. The program is thereafter executed by reading the instructions out of the main storage unit 17 one at a time, performing the operations called for by the instructions and storing the results back into the main storage unit 17. At the appropriate time or times, the results are sent back to another of the I/O devices 10, in this case, for example, a cathode-ray display unit, a typewriter unit or a printer unit to provide the visible or hardcopy output needed by the user. This is accomplished by way of data buses 15 and 19 and the I/O channel 11.

Typically, data is passed between an I/O device 10 and an I/O channel 11, one byte at a time. The I/O channel 11 includes sufficient buffering so that, in the case of incoming data, for example, enough bytes are accumulated in the buffer to present the data to the data processor bus 12 eight bytes at a time. In the case of outgoing data, the buffer holds the eight bytes received on data bus 19 for a sufficient length of time to permit one-byte-at-a-time transmission to the I/O device 10. The significant point is that the data buses within the data processor, namely, the data buses 12, 13, 15, 16, 18 and 19, as well as most of the other data buses to be mentioned hereinafter, are eight bytes in width. This means that each of the processor data buses is comprised of seventy-two bit lines or conductors for enabling the simultaneous transmission of the sixty-four data bits and eight parity check bits, which make up each segment of eight byte data.

Since the processor being considered is of the microprogrammed type, the movement and manipulation of the program instructions and data within the processor are controlled by means of microwords stored in a control storage unit 20. One microword at a time is read from the control storage unit 20 and set into a control register 21. Each microword controls the processor for one machine cycle. The control fields in each microword are decoded by a decoder 22 to provide the elemental control signals which enable and disable the various control gates associated with the different data buses in the processor. Thus, among other things, each microword determines which data buses are to be enabled during its machine cycle, hence, determining the data movement path for such machine cycle. For simplicity, the data bus control gates are not shown in FIG. 1. Each microword also includes a field containing the address of the next microword. This next microword address is supplied to a control storage address register or CSAR 23 to determine the microword to be used for the next machine cycle.

A given microword may also include a field containing a local storage address which, when appropriate, is supplied to a local address storage register or LSAR 24 for purposes of addressing a local storage unit 25. The local storage unit or local store 25 is best thought of as being a collection of high speed registers which are used for holding the various kinds of data, intermediate results, storage addresses and the like which may be needed or generated during the course of the data processing operations.

Briefly considering, in a general way, the procedure for a typical machine language program instruction sequence, the first step is to fetch the instruction from main storage 17 and set it into an instruction register 26. This is accomplished by reading the next instruction address from the instruction counter in local store 25 and setting such address into a storage address register or SAR 27 for the main store 17. Such address is supplied to SAR 27 by way of a B register 28 and an assembler 29. The addressed instruction is read from main storage 17 and supplied to the instruction register 26 via data buses 18 and 13, byte shifter and format converter 14, data buses 15 and 30, destination or D register 31 and data buses 32 and 33. As part of the instruction fetching operation, the operand addresses are calculated from the base and displacement values contained in the instruction and such results are set into appropriate operand address registers in local store 25. Also, the instruction counter in local store 25 is updated so as to contain the address of the next machine instruction.

The operation code or OP CODE portion of the machine instruction in instruction register 26 is sent to CSAR 23 for purposes of invoking the proper sequence of microwords for executing the machine instructions in question. In a more or less typical case, and there are many different variations, the instruction is executed by fetching the operands from main storage 17 and setting them into appropriate registers in the local store 25. The operands are then manipulated in the desired manner and the result put back into the local store 25. Thereafter, the result is read from local store 25 and written into the appropriate location in main store 17. The transfer of the data from local store 25 to main store 17 is accomplished by way of B register 28, assembler 29, data bus 34, bit shifter 35, data buses 36 and 13, byte shifter and format converter 14 and data buses 15 and 16.

The bit shifter 35 and the byte shifter portion of shifter/converter 14 are used to provide the normal data shifting operations which are needed during execution of various machine language program instructions, including but not limited to the various "shift" instructions. The byte shifter portion of shifter/converter 14 shifts the data in byte-sized increments or steps and the bit shifter 35 shifts the data in bit-sized increments or steps. Thus, for example, if a right shift of twenty-nine bit positions, three bytes and five bits, is desired, the byte shifter portion of shifter/converter 14 would be set to provide a three byte right shift and the bit shifter 35 would be set to provide a five bit right shift, thereby yielding an overall shift of data twenty-nine bits to the right.

For the present example of an eight byte wide data flow, the byte shifter portion of shifter/converter 14 is adapted to provide a shift amount of from zero to seven bytes to either the left or right. The bit shifter 35 is implemented to provide a shift of from zero to seven bits. The amount of shift and the direction thereof are controlled by a shifter control unit 41 which receives control information from control register 21 and, in some cases, from the instruction register 26.

Bit shifter 35 and the byte shifter portion of shifter/converter 14 are of the flow through type, as opposed to the shift register type. In other words, eight bytes of data enter the shifter, flows therethrough in a parallel manner and appears on the shifter output bus, all in one continuous movement, without resort to any shifting or clocking pulses. Instead, the shifting action is provided by means of combinational logic circuits which function to connect the conductors of the shifter input bus to the proper ones of the conductors in the shifter output data bus. Further details concerning the construction of the byte or bit shifters can be obtained by referring to the Bonner et al patent identified above.

Numerical data supplied by the I/O channel 11 to main storage 17 or supplied therefrom to the channel 11 is in a zoned decimal format. Unfortunately, the ALU or arithmetic and logic unit 39 is not capable of performing arithmetic operations with numerical data in this format. The presence of the zone fields would cause the ALU 39 to produce an erroneous result. It is, therefore, necessary to convert this zoned decimal data to a packed decimal format, by means of a packing operation, before it is sent to the ALU 39 for purposes of having it perform a numerical calculation.

The converse problem occurs when it is time to send the results of a numerical calculation to an I/O device 10. The I/O device 10 needs its data to be in the zoned format in order to be able to distinguish numbers from alphabetics, graphic symbols and control characters. In consequence, the numerical result data from the ALU 39 must be converted from the packed format to the zoned format, an "unpacking" operation, before it can be sent to the I/O device 10. This requires that the packed digit fields be spread apart and a zone code be inserted into the gaps thereby created. The zoned-to-packed and packed-to-zoned conversion operations are initiated by means of specific program derived machine language instructions which are contained in the machine language version of the user application program residing in main storage 17 when the program is being executed. The byte shifter and data format converter 14 is provided to perform such packing and unpacking operations, simultaneously on multiple bytes of data.

Referring now to FIG. 2, there is illustrated a preferred manner of construction for the byte shifter and format converter 14. Among other things, this embodiment provides a highly advantageous solution to the troublesome bit crossover problem mentioned in the Bonner et al patent. To this end, the shifter/converter 14 includes a first integrated circuit chip 42 for receiving and processing the first, bit 0, and fifth, bit 4, data bits of each of the eight data bytes that appear on its input data bus 13. It further includes a second integrated circuit chip 43 for processing bits 1 and 5 of the incoming data bytes, a third integrated circuit chip 44 for handling bits 2 and 6 of the incoming data bytes and a fourth integrated circuit chip 45 for dealing with bits 3 and 7 of the incoming data bytes. The eight parity check bits are received and processed by circuitry located on a further integrated circuit chip 46.

Each of the input conductor groups 13a–13i includes a set of eight conductors for simultaneously passing the proper ones of the data bits and parity bits on the input bus 13 to the proper ones of the different integrated circuit chips 42–46. For example, conductor group 13a simultaneously supplies the bit 0 bits of each of the eight data bytes to the integrated circuit chip 42 and the conductor group 13b does the same for the bit 4 bits. Similarly, each of the output conductor groups 15a–15i includes a set of eight conductors for passing data bits and parity bits from the integrated chips 42–46 to the output data bus 15. Again, the specific details of the integrated circuit chips 42–46 and of the buses 13 and 15 can be obtained by reference to the Bonner et al patent.

It is sufficient for purposes of this discussion to understand that each parity bit associated with each one of the eight transmitted data bytes is stripped therefrom, for example, as part of a packing operation. Eventually, each parity bit is reunited with the byte that it was associated with and parity can be checked. However, a check made at this point will not be able to isolate the reason for any parity error that is found. It may be that the data was in error when it entered the byte shifter and data format converter 14 or the error may have been caused in the shifter/converter itself. Testing each of the data buses that connect to the shifter/converter input bus 13 would be inpractical and costly since one parity check mechanism would be required for each of the possible inputs. In the case of the simplified arrangement shown in FIG. 1, inputs from at least the I/O channel 11, main store 17 and bit shifter 35 would have to be parity checked. In actual practice, a sophisticated processor may have several additional inputs to bus 13, such as, for example, the input from a multiplier quotient register, that would each have to be checked if a parity error were to be isolated or its effects avoided. It would, therefore be economically prudent to verify parity by checking the output from the byte shifter and data format converter 14, since that is the element that all of the input lines of possible concern are routed to. In this instance, however, that cannot be accomplished in the normal textbook manner because of the disassociation of the parity bits from the data bytes that they are intended to provide verification for. This problem is overcome through the use of the present invention.

As shown in FIG. 2, outputs 50a–50i are provided from each of the integrated circuit chips 42–46. These outputs are each adapted to present thereon, the respective bit groupings of the eight byte data word that was present on the input data bus of the shifter/converter 14. Thus, after the bits of each byte have been disassociated, but before they are formatted, they will appear on the output lines 50a–50i provided for that purpose. Output line 50a will carry all eight of the 0 bits of the eight bytes -presented to bus 13. In a similar manner, output lines 50b–50h will respectively carry the 1–7 bits of the eight bytes. The eight parity bits will be carried by output line 50i.

Figure 3:
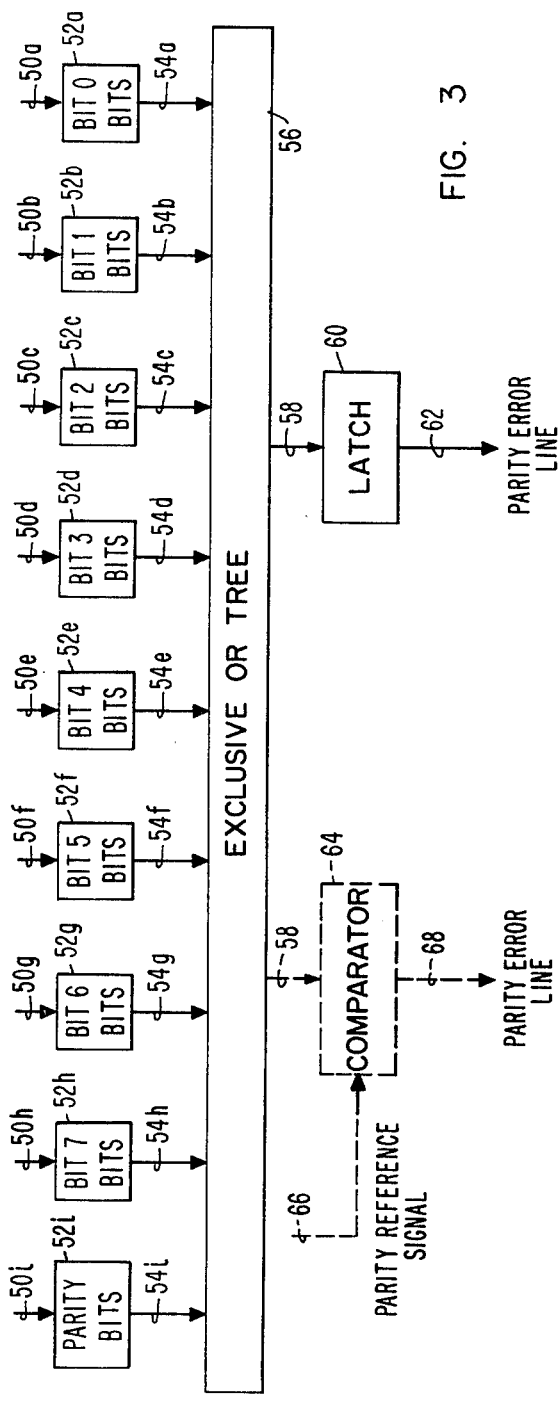
FIG. 3 is also a functional block diagram which depicts bit generating means and logical circuit means for determining the parity thereof in accordance with the present invention.

Referring now to FIG. 3, the input lines 50a–50i are shown connected respectively to parity generators 52a–52i. The parity generators 52a–52i are identical and all function in the same manner. Each of these receives a group eight bits and generates a parity bit therefor based on a predetermined scheme, which in this instance, is selected as odd parity to match overall system parity usage. The resultant arrangement, which will be explained with reference to only one of the parity generators since their use and operation is the same, results in a parity bit being generated for each of the nine groups of disassociated bits in accordance with this parity convention. Thus, the output bus line 50a carries all of the zero bits from the eight bytes that originally appeared on the input bus 13 of the shifter/converter 14.

These eight zero bits are added by the parity generator 52a and any carry is discarded. If the result is now a zero or even, a one is added thereto and becomes the parity bit for these regrouped eight bits, in conformity with the use of odd parity convention. Conversely, if the result of the summation is a one, the parity bit is fixed at zero. In either case, the generated parity bit appears on output line 54a of the parity generator 52a. The parity bits for the other bit groups, including one for the parity bits as well, are similarly generated and placed on the output lines 54b–54i, respectively.

The nine generated parity bits are then presented to the inputs of an exclusive OR tree (XOR) 56, which generates a logical high output on line 58 if, and only if, the parity of all of the inputs 54a–54i thereto is odd. Parity tree 56 is actually comprised of a series of XOR gates that have cascaded together to form a tree. It is shown as a single element for the sake of simplicity, but it is understood in this art that the necessary number of XOR gates are ganged together as needed. Thus, the input signals to the XOR tree 56 are actually paired and then input to a plurality of exclusive OR gates (not shown). The results thereof are also paired and fed to further XOR gates and this step is repeated as required to accommodate the total number of original inputs to the XOR tree 56. The output parity signal of all of 72 bits of the original data then appears on the output 58 of XOR tree 56. The result of cascading all of the generated parity signals is a parity signal therefor, an indication of whether the generated parity signals for the disassociated bits represent an alteration of an odd number of bits. An even number of compensating errors will, of course, not be detected.

The XOR tree 56 output signal is then be fed to a latch 60, the output 62 of which will be held thereby at the value of the output of the XOR tree 56. If line 62 goes to a logical one, this would mean, using an odd parity convention, that a parity error has occurred and that an appropriate alarm can be given. If even parity had been selected as the parity convention, then the resultant parity signal on line 62 would be set to a logical one when parity is correct. It will be appreciated by those having skill in this art that the foregoing arrangement for determining parity of disassociated bits will only be effective in those instances where an odd number of bits have been altered since an even number of errors mutally cancel each other's effect. Alternatively, the output 58 of the XOR tree 56 could be compared, by an appropriate comparator 64, to a signal 66 representative of correct parity to thereby determine if the resultant parity signal is what it should be. If it is not, a signal indicative thereof can be generated, as above, on the output line 68 of the comparator 64 for alarm purposes. This alternative method of verifying the resultant parity is shown in dashed lines in FIG. 3.

While the present invention has been described in the context of a preferred embodiment thereof, it will be readily apparent to those skilled in the appertaining art, that modifications and variations can be made therein without departing from the spirit and scope of the present invention. Accordingly it is not intended that the present invention be limited to the specifics of the foregoing description of the preferred embodiment. Instead, the present invention should be considered as being limited solely by the appended claims which alone are intended to define its scope.

Having thus described my invention, what I claim as new and desire to secure by Letters Patent, is as follows:

1. Apparatus for checking the parity of multibyte data that is to be manipulated in a data processing system, the individual bytes of said data each originally having a parity bit normally associated therewith that has been generated in accordance with a predetermined parity scheme, said parity checking apparatus comprising:
   (a) a multibyte data bus for conveying a plurality of data bytes;
   (b) byte shifting means, coupled to said bus, for receiving the bytes of data conveyed thereto by said data bus and for operating thereon in a manner which causes the parity bits associated with each byte of conveyed data to become disassociated therefrom, thereby making parity-less bytes of data available at its output;
   (c) first circuit means, coupled to receive said now disassociated, parity-less data bytes and the original parity bits from said byte shifting means, for generating a new parity bit, in accordance with said predetermined parity scheme, for each byte of data available at the output of said byte shifting means and
   (d) second circuit means, coupled to receive said generated parity bit signals of said first circuit means, for comparing said parity bit signals and for generating an output signal, in accordance with, said predetermined parity scheme, indicative of parity for data that has been passed from said multibyte data bus into and through said byte shifting means.

2. The apparatus according to claim 1 wherein the output of said byte shifting means is grouped according to original bit position of said multibyte data and said first circuit means includes a plurality of logic circuit means, one for each of said groups of original data bits including said parity bits thereof, coupled to receive said bit groups of disassociated, parity-less data bytes and said group of original parity bits from said byte shifting means, for generating a new parity bit, in accordance with said predetermined parity scheme, for each byte of data received.

3. Apparatus according to claim 1 wherein said second circuit means includes:
   (a) an exclusive OR tree circuit coupled to receive and operate on the parity bit output of said first circuit means for generating an output parity signal for all of the inputs thereto; and
   (b) parity indicating circuit means, coupled to receive said output signal of said exclusive OR circuit, for latching said output thereof to its determined parity state.

4. The apparatus according to claim 3 wherein the output of said byte shifting means is grouped according to original bit position of said multibyte data and said first circuit means includes a plurality of logic circuit means, one for each of said groups of original data bits including said parity bits thereof, coupled to receive said bit groups of disassociated, parity-less data bytes and said group of original parity bits from said byte shifting means, for generating a new parity bit, in accordance with said predetermined parity scheme, for each byte of data received.

5. Apparatus according to claim 1 wherein said second circuit means includes:
   (a) an exclusive OR tree circuit coupled to receive and operate on the parity bit output of said first circuit means for generating an output parity signal for all of the inputs thereto; and
   (b) parity reference signal circuit means for generating a parity reference signal indicative of proper parity for the multibyte data being utilized; and
   (c) parity indicating circuit means, coupled to receive said output signal of said exclusive OR circuit and said parity reference signal, for comparing said signals and for generating a first output signal when said signals are logically the same and a second output signal when they are not.

6. The apparatus according to claim 5 wherein the output of said byte shifter means is grouped according to original bit position of said multibyte data and said first circuit means includes a plurality of logic circuit means, one for each of said groups of original data bits including said parity bits thereof, coupled to receive said bit groups of disassociated, parity-less data bytes and said group of original parity bits from said byte shifting means, for generating a new parity bit, in accordance with said predetermined parity scheme, for each byte of data received.

7. A method for checking the parity of multibyte data that is to be manipulated in a data processing system, the individual bytes of said data each originally having a parity bit normally associated therewith that has been generated in accordance with a predetermined parity scheme, said parity checking method comprising:
   (a) providing a multibyte data bus for conveying a plurality of data bytes thereon;
   (b) forwarding said plurality of data bytes to byte shifting means;
   (c) operating on said forwarded data bytes in a manner which causes the parity bits associated with each byte of conveyed data to become disassociated therefrom, thereby making groups of parity-less bytes of data and a group of original parity bits available at the output of the byte shifting means;
   (d) forwarding the groups of data from the output of the byte shifting means to parity generator means;
   (e) generating a new parity bit for each group of eight bits of original data bytes received and a parity bit for the group of original parity bits received in accordance with the predetermined parity scheme;
   (f) forwarding the generated parity bits to comparator means; and
   (g) comparing the generated parity bits to each other, in accordance with the predetermined parity scheme, to determine their parity.

* * * * *